United States Patent
Nishio (10) Patent No.: US 8,089,412 B2
(45) Date of Patent: Jan. 3, 2012

(54) ANTENNA DEVICE AND RADIO COMMUNICATION DEVICE

(75) Inventor: Masaki Nishio, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 351 days.

(21) Appl. No.: 12/289,093

(22) Filed: Oct. 20, 2008

(65) Prior Publication Data
US 2009/0167617 A1    Jul. 2, 2009

(30) Foreign Application Priority Data
Dec. 27, 2007  (JP) ................. 2007-336557

(51) Int. Cl.
*H01Q 1/24*  (2006.01)
(52) U.S. Cl. ..................................... 343/702
(58) Field of Classification Search ............... 343/702, 343/876, 846, 818, 833–834
See application file for complete search history.

(56) References Cited

U.S. PATENT DOCUMENTS

| | | | | |
|---|---|---|---|---|
| 4,924,237 | A * | 5/1990 | Honda et al. ................. | 343/702 |
| 5,231,407 | A * | 7/1993 | McGirr et al. ......... | 343/700 MS |
| 6,753,815 | B2 | 6/2004 | Okubora et al. | |
| 6,888,504 | B2 * | 5/2005 | Chiang et al. ................. | 343/702 |
| 7,180,464 | B2 * | 2/2007 | Chiang et al. ................. | 343/833 |
| 7,439,918 | B2 * | 10/2008 | Iwai et al. ..................... | 343/702 |
| 2004/0150568 | A1 * | 8/2004 | Chiang et al. ................. | 343/702 |
| 2005/0052324 | A1 * | 3/2005 | Anderson et al. ............ | 343/702 |
| 2007/0030108 | A1 | 2/2007 | Ishimoto et al. | |

FOREIGN PATENT DOCUMENTS

| | | |
|---|---|---|
| JP | 10-224142 | 8/1998 |
| JP | 11-298231 | 10/1999 |
| JP | 2002-261533 | 9/2002 |
| JP | 2002-353867 | 12/2002 |
| JP | 2006-032587 | 2/2006 |
| WO | 2007/084094 | 7/2007 |

OTHER PUBLICATIONS

Rebeiz, Gabriel M., et al., "MEMS Switch Reliability and Power Handling", RF MEMS Theory, Design and Technology, Chap. 7, Sec. 1, pp. 185-189, (2003).
Office Action dated Aug. 30, 2011 in Jp Application No. 2007-336557 and English-language translation thereof.

* cited by examiner

*Primary Examiner* — Huedung Mancuso
(74) *Attorney, Agent, or Firm* — Nixon & Vanderhye, P.C.

(57) ABSTRACT

There is provided with an antenna device includes a conductive ground plane; an antenna including a radiating element; at least one variable capacitor having one end connected to the conductive ground plane; a plurality of switch elements having one ends connected to the other end of said at least one variable capacitor and other ends connected to the antenna at different locations; a switch controlling unit configured to control an ON/OFF state of each of the switch elements; and a capacitor controlling unit configured to control a capacitance of said at least one variable capacitor.

10 Claims, 13 Drawing Sheets

FIG. 1

| | ON/OFF STATE OF MEMS CAPACITOR | CONNECTING-LOCATION-SPECIFIC RESONANT FREQUENCY | | |
|---|---|---|---|---|
| | | A | B | C |
| ① | OFF | F3 | F2 | F1 |
| ② | ON | F4 | F3 | F2 |

| | MEMS CAPACITOR 107A | MEMS CAPACITOR 107B | MEMS CAPACITOR 107C | CONNECTING-LOCATION-SPECIFIC RESONANT FREQUENCY | | |
|---|---|---|---|---|---|---|
| | | | | A | B | C |
| ① | OFF | OFF | OFF | F3 | F2 | F1 |
| ② | ON | OFF | OFF | F4 | F3 | F2 |
| ③ | OFF | ON | OFF | F5 | F4 | F3 |
| ④ | ON | ON | OFF | F6 | F5 | F4 |
| ⑤ | OFF | OFF | ON | F7 | F6 | F5 |
| ⑥ | ON | OFF | ON | F8 | F7 | F6 |
| ⑦ | OFF | ON | ON | F9 | F8 | F7 |
| ⑧ | ON | ON | ON | F10 | F9 | F8 |

ANTENNA DEVICE AND RADIO COMMUNICATION DEVICE

CROSS REFERENCE TO RELATED APPLICATIONS

This application is based upon and claims the benefit of priority from the prior Japanese Patent Applications No. 2007-336557, filed on Dec. 27, 2007; the entire contents of which are incorporated herein by reference.

BACKGROUND OF THE INVENTION

1. Field of the Invention

The present invention relates to an antenna device and a radio communication device.

2. Related Art

Because of the advantages of low distortion and low loss, the use of a MEMS (Micro Electro Mechanical System) capacitor as a variable capacitor for a tunable antenna has been researched. There has also been researched the use of a MEMS bank which varies its capacitance value by switching the ON/OFF states of a plurality of MEMS capacitors connected in parallel to create different combinations of the ON/OFF states.

However, a MEMS capacitor is a mechanical part and may suffer from the problem of stiction specific to MEMS elements, which is a phenomenon where electrodes may cling to each other during repetitions of ON/OFF operation and lock up in ON state. To cope with this, it is conceivable to provide in advance a spare MEMS capacitor to serve as a substitute for a locked-up element. However, the additional capacitance of the locked-up MEMS capacitor increases the lowest capacitance value. As a result, the frequency is shifted to the low-frequency side, thereby preventing achievement of a desired high frequency.

Non-patent Document 1: Gabriel M. Rebeiz, "RF MEMS: Theory, Design and Technology"

SUMMARY OF THE INVENTION

According to an aspect of the present invention, there is provided with a conductive ground plane;

an antenna including a radiating element;

at least one variable capacitor having one end connected to the conductive ground plane;

a plurality of switch elements having one ends connected to the other end of said at least one variable capacitor and other ends connected to the antenna at different locations;

a switch controlling unit configured to control an ON/OFF state of each of the switch elements; and a capacitor controlling unit configured to control a capacitance of said at least one variable capacitor.

According to an aspect of the present invention, there is provided with a radio communication device comprising:

an antenna device according to claim 1; and a radio processing unit configured to perform radio communication through the antenna device.

DETAILED DESCRIPTION OF THE INVENTION

Embodiments of the present invention will be described in detail below with reference to the drawings.

Figure 1:
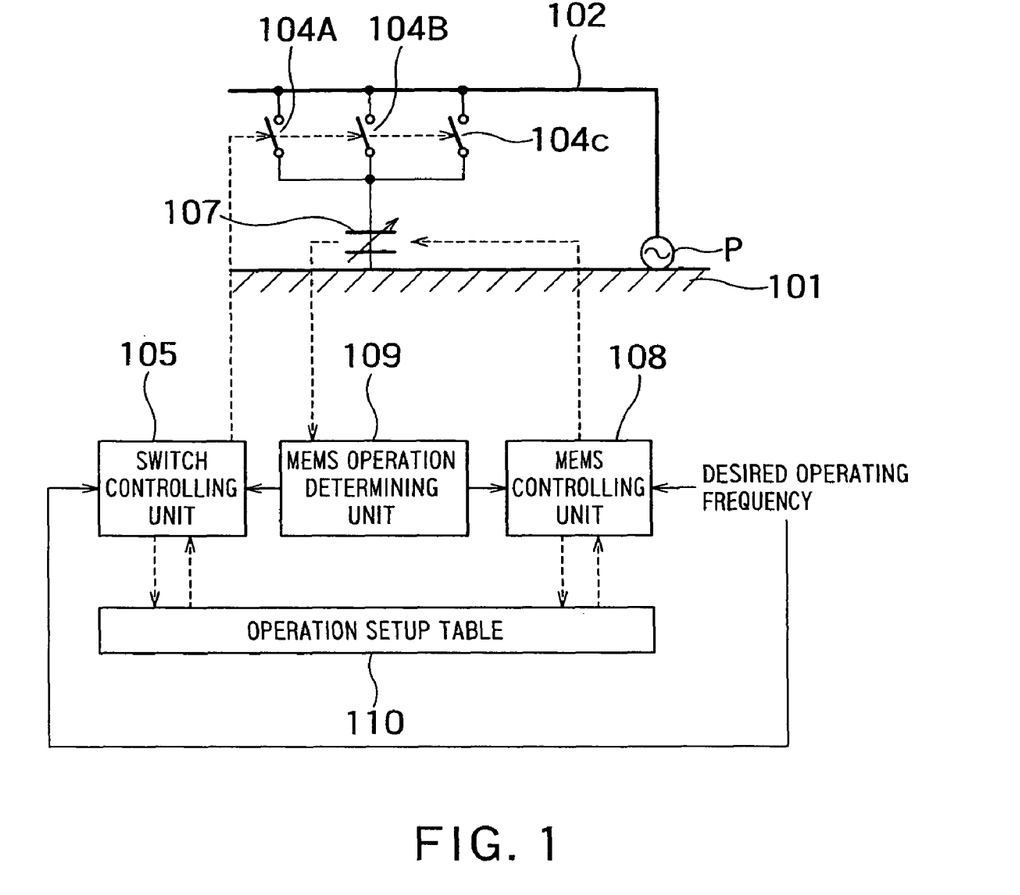
FIG. 1 is a diagram showing the schematic configuration of an antenna device according to a first embodiment of the present invention.

FIG. 1 is a diagram showing the schematic configuration of an antenna device according to a first embodiment of the present invention.

The antenna device includes a conductive ground plane 101, an antenna element (an antenna having a radiating element) 102, a feeding point P through which power is supplied to the antenna element 102, a MEMS capacitor (variable capacitor) 107 having one end connected to the conductive ground plane 1, a plurality of switch elements (hereinafter simply referred to as switches) 104A to 104C having one ends connected to the other end of the MEMS capacitor 107 and the other ends connected to the antenna element 102 at different locations (denoted by reference characters A, B, and C, starting from the left in FIG. 1), a switch controlling unit 105 which controls the ON/OFF states of the plurality of switches 104A to 104C, a MEMS controlling unit (capacitor controlling unit) 108 which controls the capacitance of the MEMS capacitor 107, a MEMS operation determining unit 109 which determines the operating state of the MEMS capacitor 107, and an operation setup table 110.

The antenna element 102 is an L-shaped monopole antenna element. One end of the antenna element 102 is connected to the conductive ground plane 1 through the feeding point P, and the other end is open.

The switch controlling unit 105 independently controls the ON/OFF states of the plurality of switches 104A to 104C. In this embodiment, only any one of the switches 104A to 104C is turned on while the others are turned off. The present invention, however, is not limited to this and may include a case where two or more of the switches 104A to 104C are simultaneously turned on.

The MEMS capacitor 107 is an example of a variable capacitor, and can be configured to have multiple levels of capacitance. In this embodiment, two levels of capacitance can be set. The two levels of capacitances include a capacitance when electrodes of the MEMS capacitor 107 are in contact with each other (an ON-state capacitance) and a capacitance when the electrodes are spaced apart from each other by a predetermined distance (an OFF-state capacitance). Since the MEMS capacitor 107 is a mechanical part, it may fail during repetitions of ON/OFF operation while being in ON state or OFF state. Electrodes of a failed MEMS capacitor become unable to move, and the MEMS capacitor is fixed at either ON state or OFF state. A method for detecting a failure in a MEMS element is well known, and a method for determining whether there is stiction in a MEMS capacitor is disclosed in, e.g., IP-A 2006-032587 (Kokai). This publication mentions a method of monitoring the amount of charge stored or a pull-out voltage when a MEMS capacitor is OFF, and the like.

The MEMS operation determining unit 109 checks the operating state of the MEMS capacitor 107 and determines whether there is a failure in the MEMS capacitor 107. If there is a failure, the MEMS operation determining unit 109 further detects whether the MEMS capacitor 107 is in ON state or OFF state. The MEMS operation determining unit 109 includes a capacitor failure detecting unit which detects a failure in a variable capacitor and a capacitance level detecting unit which detects the capacitance level of a failed variable capacitor. The MEMS operation determining unit 109 notifies the switch controlling unit 105 and MEMS controlling unit 108 of the result of the operation determination (the presence or absence of a failure and, in the event of a failure, the capacitance).

Figure 2:
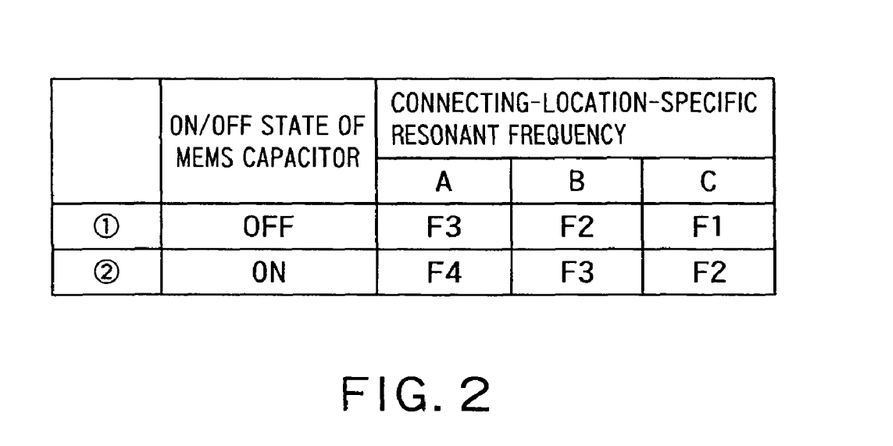
FIG. 2 is a chart showing an example of an operation setup table 110 according to the first embodiment.

The operation setup table 110 holds an operating frequency of the antenna element 102 for each of combinations of the capacitance level of the MEMS capacitor 107 and the ON/OFF states of the plurality of switches 104A to 104C. FIG. 2 shows an example of the operation setup table 110. The plurality of switches 104A to 104C are set such that any one of them is ON while the others are OFF. For example, when the MEMS capacitor 107 is ON, the switch 104A is ON, and the switches 104B and 104C are OFF, the operating frequency (resonant frequency) of the antenna element 102 is "F4." Operating frequencies of "F3" and "F2" can be achieved either when the MEMS capacitor 107 is ON or when it is OFF.

A value indicating a desired operating frequency of the antenna element 102 is inputted to the MEMS controlling unit 108 and switch controlling unit 105 from an external unit (radio unit etc.). That is, the MEMS controlling unit 108 and switch controlling unit 105 include an operating frequency receiving unit which receives the desired operating frequency from the external unit (radio unit etc.). The MEMS controlling unit 108 and switch controlling unit 105 control the capacitance of the MEMS capacitor and the ON/OFF states of the switches so that the antenna element has the desired operating frequency received by the operating frequency receiving unit.

More specifically, the MEMS controlling unit 108 and switch controlling unit 105 refer to the operation setup table 110 and select a setting (combination) having the desired operating frequency. The MEMS controlling unit 108 and switch controlling unit 105 include a detecting unit which refers to the operation setup table 110 to detect a setting (combination) having the desired operating frequency. If there are a plurality of settings having the desired operating frequency, the MEMS controlling unit 108 and switch controlling unit 105 select one of the settings which turns on, of the switches to be turned on by the settings, one closest to the tip (open end) of the antenna element 102. This is because the closer a selected switch is to the tip of the antenna element 102, the higher achieved antenna efficiency is. The details will be described later. The switch 104A is closest to the tip of the antenna element 102, followed in order by the switch 104B and switch 104C.

For example, assume that "F2" is given as the desired operating frequency. In this case, the MEMS controlling unit 108 and switch controlling unit 105 refer to the operation setup table 110, search for a setting by which "F2" is achieved, and find two settings. The two settings are one to turn on the switch 104B and one to turn on the switch 104C. Since the switch 104B is closer to the tip of the antenna element 102, the MEMS controlling unit 108 and switch controlling unit 105 select the setting to turn on the switch 104B.

Note that if the MEMS controlling unit 108 and switch controlling unit 105 are notified of a failure in the MEMS capacitor 107 by the MEMS operation determining unit 109, they make a selection in consideration of the state of the MEMS capacitor 107. For example, if the MEMS capacitor 107 is fixed at ON state due to a failure, the MEMS controlling unit 108 and switch controlling unit 105 select, from settings for the MEMS capacitor 107 in ON state in the operation setup table 110, one by which the desired operating frequency can be achieved. If the desired operating frequency is "F2," the MEMS controlling unit 108 and switch controlling unit 105 select a setting to turn on the switch 104C and turn off the switches 104A and 104B. Note that since the MEMS controlling unit 108 has been notified of the failure in the MEMS capacitor 107, it stops operation.

The reason why the closer a selected (turned-on) switch is to the tip of the antenna element, the higher achieved antenna efficiency is will be described with reference to FIG. 3.

Figure 3:
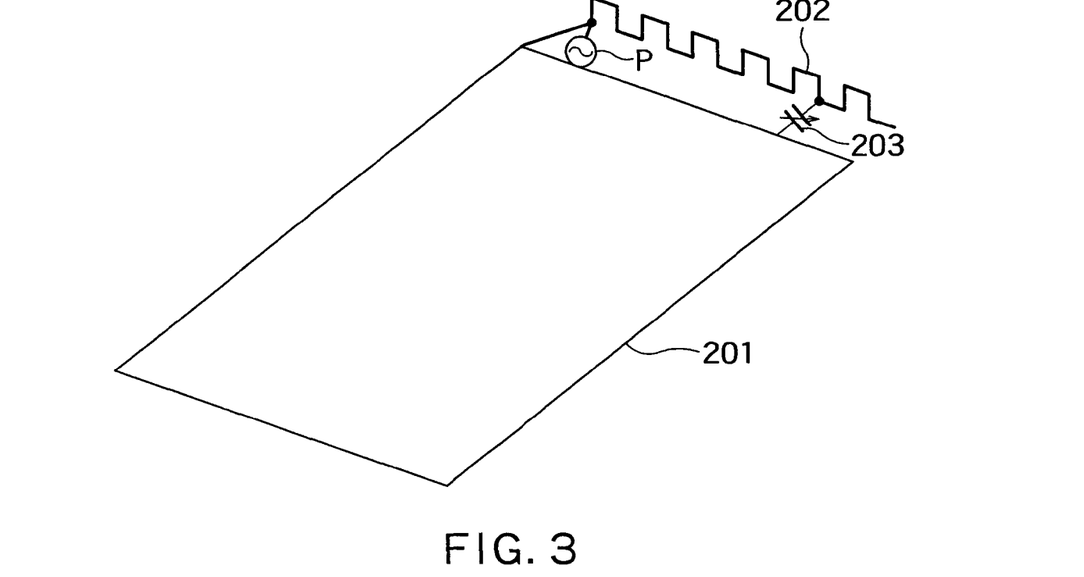
FIG. 3 is a view showing an antenna device in which an inverted F antenna element is provided at a short side of a conductive board.
Figure 4:
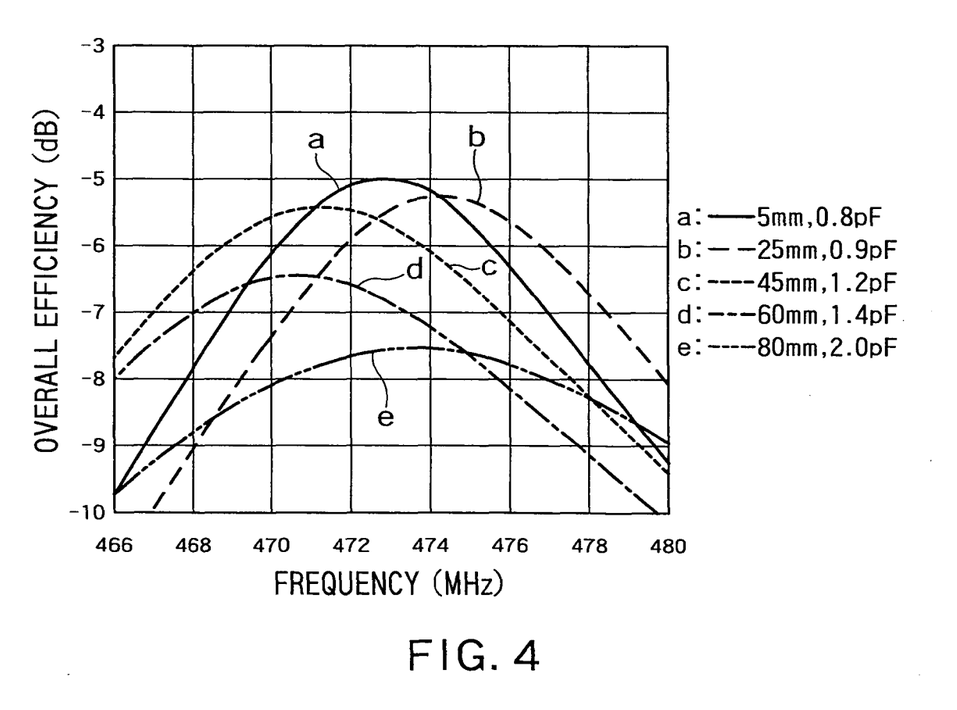
FIG. 4 is a graph for explaining the antenna efficiency of the antenna device in FIG. 3.

FIG. 3 shows an antenna device in which an inverted F antenna element 202 whose length from the feeding point P to an open end is 128 mm is provided at a short side of a conductive ground plane 201 (110 mm×65 mm in size). The series resistance component of a MEMS capacitor (variable capacitor) 203 is set to 4.23Ω, and the inverted F antenna element 202 and conductive ground plane 201 are short-circuited by the MEMS capacitor 203. FIG. 4 shows the result of calculating overall antenna efficiency, which is a combination of radiation efficiency and a power transmission coefficient, while varying a location where the antenna element 202 and MEMS capacitor 203 are connected among 5 mm, 25 mm, 45 mm, 60 mm, and 80 mm from the tip of the antenna. Capacitance values for the MEMS capacitor 203 corresponding to the connecting locations are 0.8 pF, 0.9 pF, 1.2 pF, 1.4 pF, and 2.0 pF, respectively. It can be seen from FIG. 4 that the closer the connecting location is to the tip of the antenna element, the higher achieved efficiency is. In other words, a capacitance value required decreases with a decrease in the distance to the tip of the antenna element, and loss becomes more unnoticeable with the decrease in capacitance value. Accordingly, the closer the connecting location is to the tip of the antenna element, the higher achieved antenna efficiency is.

Figure 5:
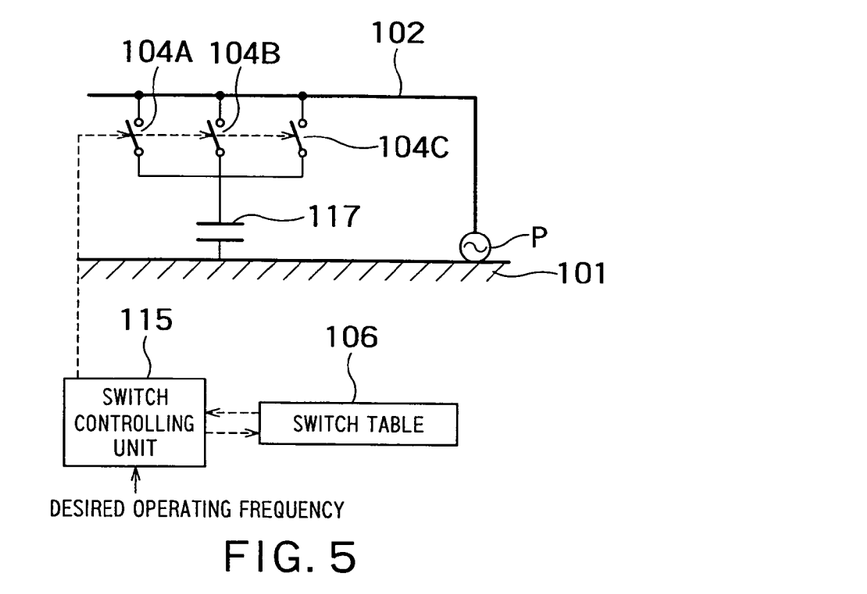
FIG. 5 is a diagram showing an example of an antenna device using a capacitor with a fixed capacitance.

As described above, in the antenna device in FIG. 1, the operating frequency of the antenna can be made variable by varying the capacitance of the MEMS capacitor 107 and a location where the antenna element 102 and MEMS capacitor 107 are connected (i.e., varying the ON/OFF states of the switches). This will be described in detail below. An example of an antenna device using a capacitor with a fixed capacitance instead of the MEMS capacitor 107 is shown in FIG. 5, for simplicity of illustration. The relationship among the ON/OFF states of the switches 104A to 104C and an operating frequency is set in a switch table 106. A value indicating a desired operating frequency is input to a switch controlling unit 115, and a setting by which the value is achieved is acquired from the switch table 106, thereby controlling the ON/OFF states of the switches 104A to 104C.

Figure 6:
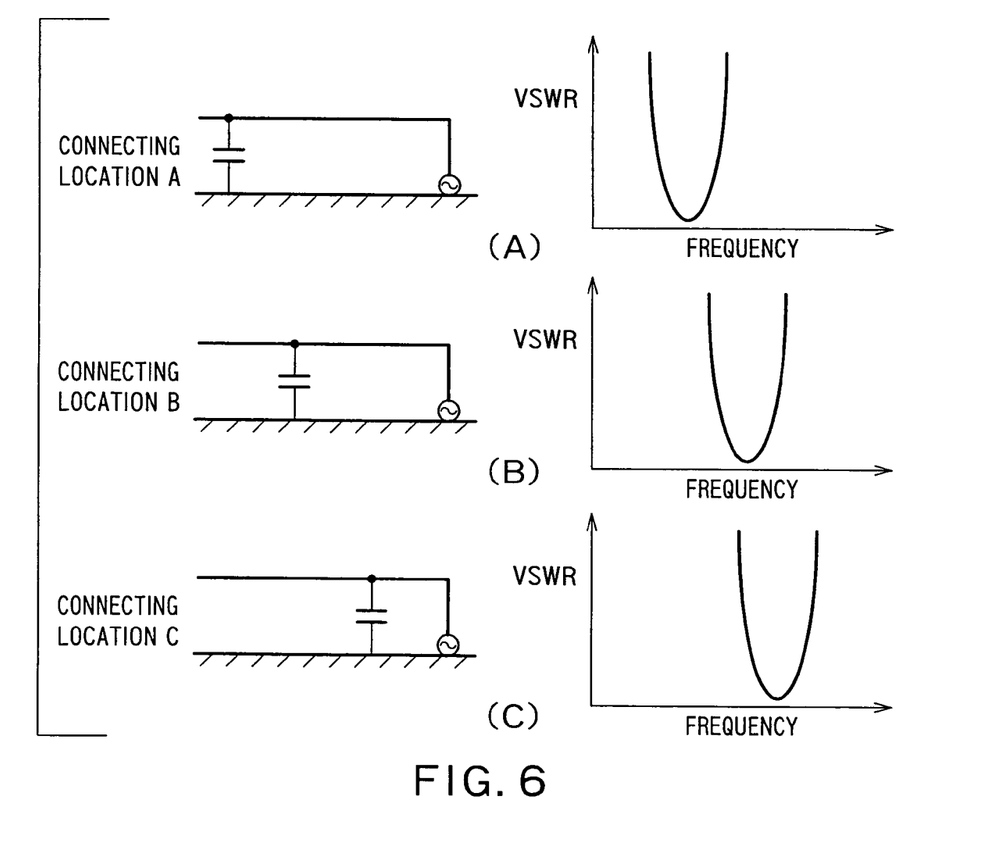
FIG. 6 is a diagram and a graph for explaining the VSWR-frequency characteristic of the antenna device in FIG. 5.

FIG. 6(A) shows the schematic configuration and VSWR-frequency characteristic when the switch 104A is selected in the antenna device in FIG. 5. Similarly, FIGS. 6(B) and 6(C) show the schematic configuration and VSWR-frequency characteristic when the switch 104B is selected and the schematic configuration and VSWR-frequency characteristic when the switch 104C is selected, respectively.

When an antenna element of the monopole type is in resonant state with standing waves, the voltage amplitude is large at the tip of the antenna element. For this reason, the closer a capacitor to be connected to the antenna element is connected to the tip of the antenna element, the more the antenna element is affected by the capacitor. Accordingly, as can be seen from FIGS. 6(A) to 6(C), the closer the capacitor is connected to the tip of an antenna element, the more the operating frequency of the antenna element is shifted to the low-frequency side.

Note that if the capacitor is not connected to the antenna element, the operating frequency of the antenna element is shifted more to the high-frequency side than that in FIG. 6(C). It has been confirmed from simulations by the present inventors that if the plurality of switches are turned on (the capacitor is connected at a plurality of locations), an operating frequency corresponding to one of the connecting locations which is closest to a feeding point is achieved.

As described above, switching of a location where an antenna element and a capacitor are connected makes the operating frequency of the antenna element variable. Additionally, the MEMS capacitor 107 can be used as a capacitor, as in FIG. 1, to set more operating frequencies depending on the number of possible levels of the variable capacitor.

Figure 7:
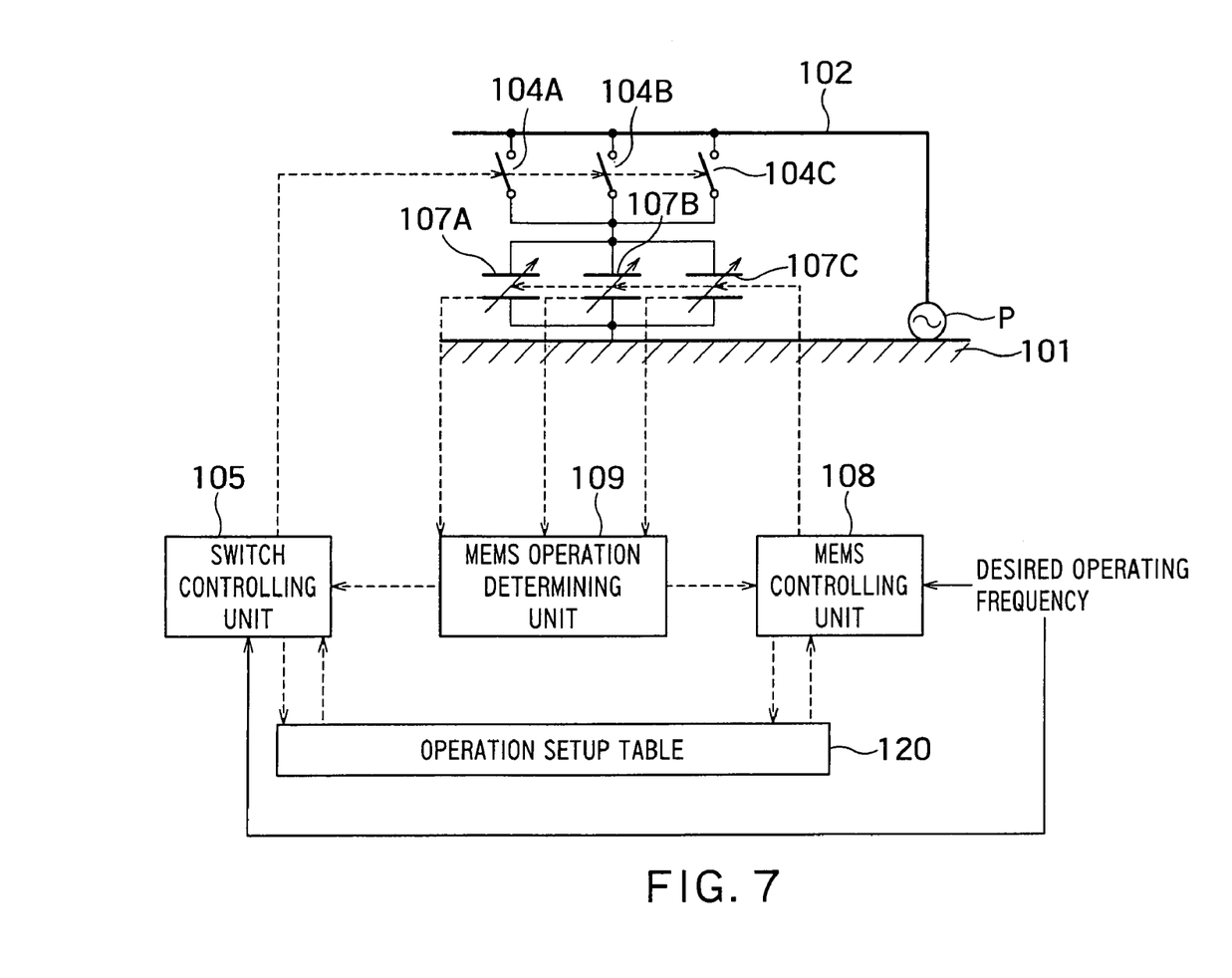
FIG. 7 is a diagram showing the schematic configuration of an antenna device according to a second embodiment of the present invention.

FIG. 7 is a diagram showing the schematic configuration of an antenna device according to a second embodiment of the present invention.

Figure 8:
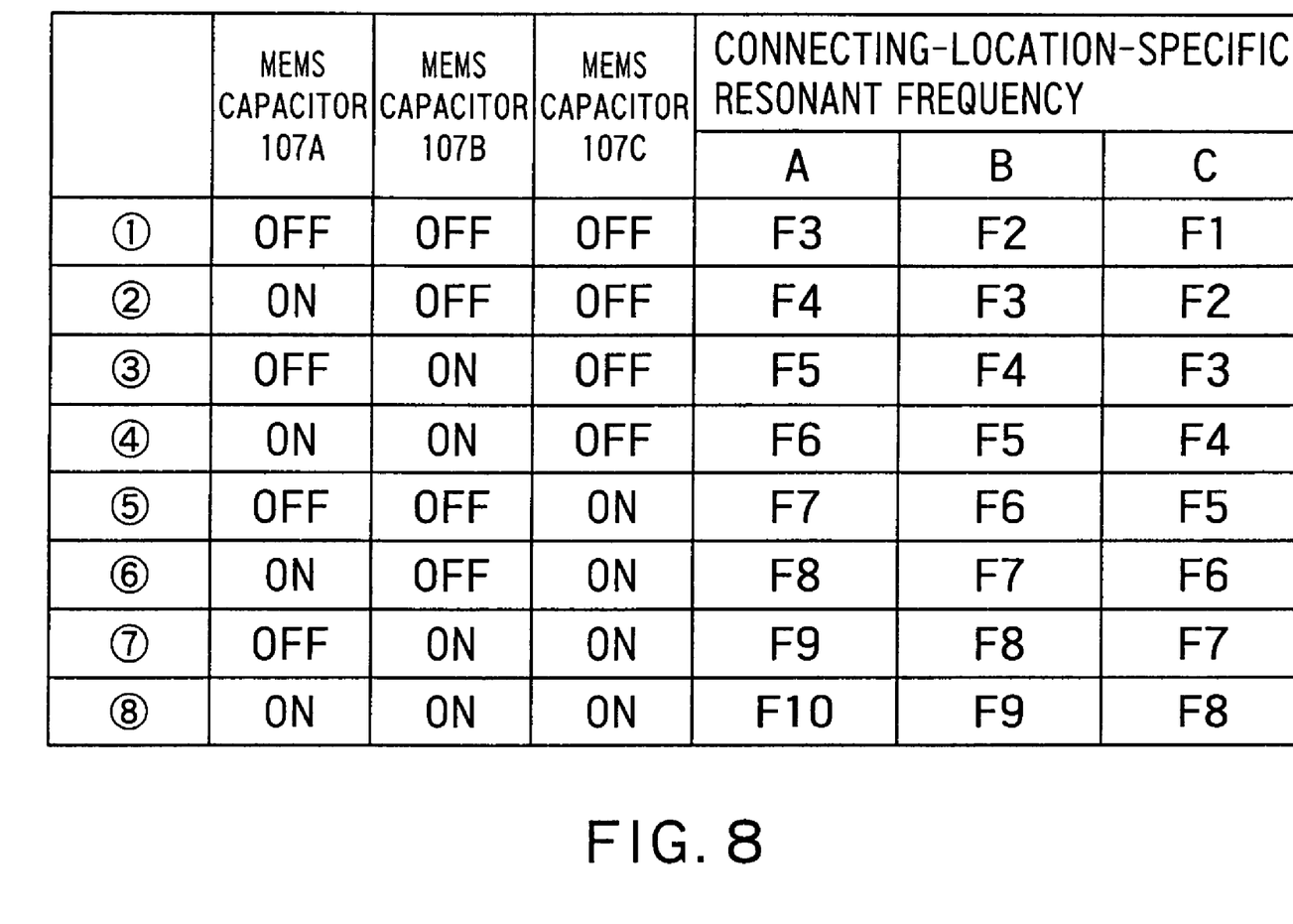
FIG. 8 is a chart showing an example of an operation setup table 120 according to the second embodiment.

Although the number of MEMS capacitors is one in the antenna device in FIG. 1, the antenna device in FIG. 7 includes three MEMS capacitors 107A to 107C. One ends of the MEMS capacitors 107A to 107C are connected to a conductive ground plane 101, and the other ends are respectively connected to one ends of switches 104A to 104C. A digital variable capacitor with a variable capacitance value is implemented by combining the ON/OFF states of the plurality of MEMS capacitors. Since the number of MEMS capacitors is larger than that in FIG. 1, an operation setup table 120 is set in detail accordingly. FIG. 8 shows an example of the operation setup table 120.

In FIG. 8, reference characters A, B, and C denote locations where an antenna element 102 and MEMS capacitors are connected. More specifically, the connecting location A means turning on the switch 104A and turning off the switches 104B and 104C; the connecting location B, turning on the switch 104B and turning off the switches 104A and 104C; and the connecting location C, turning on the switch 104C and turning off the switches 104A and 104B.

Combination of the ON/OFF states of the MEMS capacitors and the ON/OFF states of the switches makes it possible to achieve a larger number of operating frequencies than those of the antenna device in FIG. 1 and obtain a large number of settings by which a single operating frequency is achieved. For example, if the antenna element is desired to be operated at an operating frequency of "F4," there are available three combinations: connecting location A, 107A ON, 107B OFF, 107C OFF; connecting location B, 107A OFF, 107B ON, 107C OFF; and connecting location C, 107A ON, 107B ON, 107C OFF. Assume that, letting Ca, Cb, and Cc be the ON-state capacitances of the MEMS capacitors 107A, 107B, and 107C, the relationship Ca<Cb<Cc holds.

Figure 9:
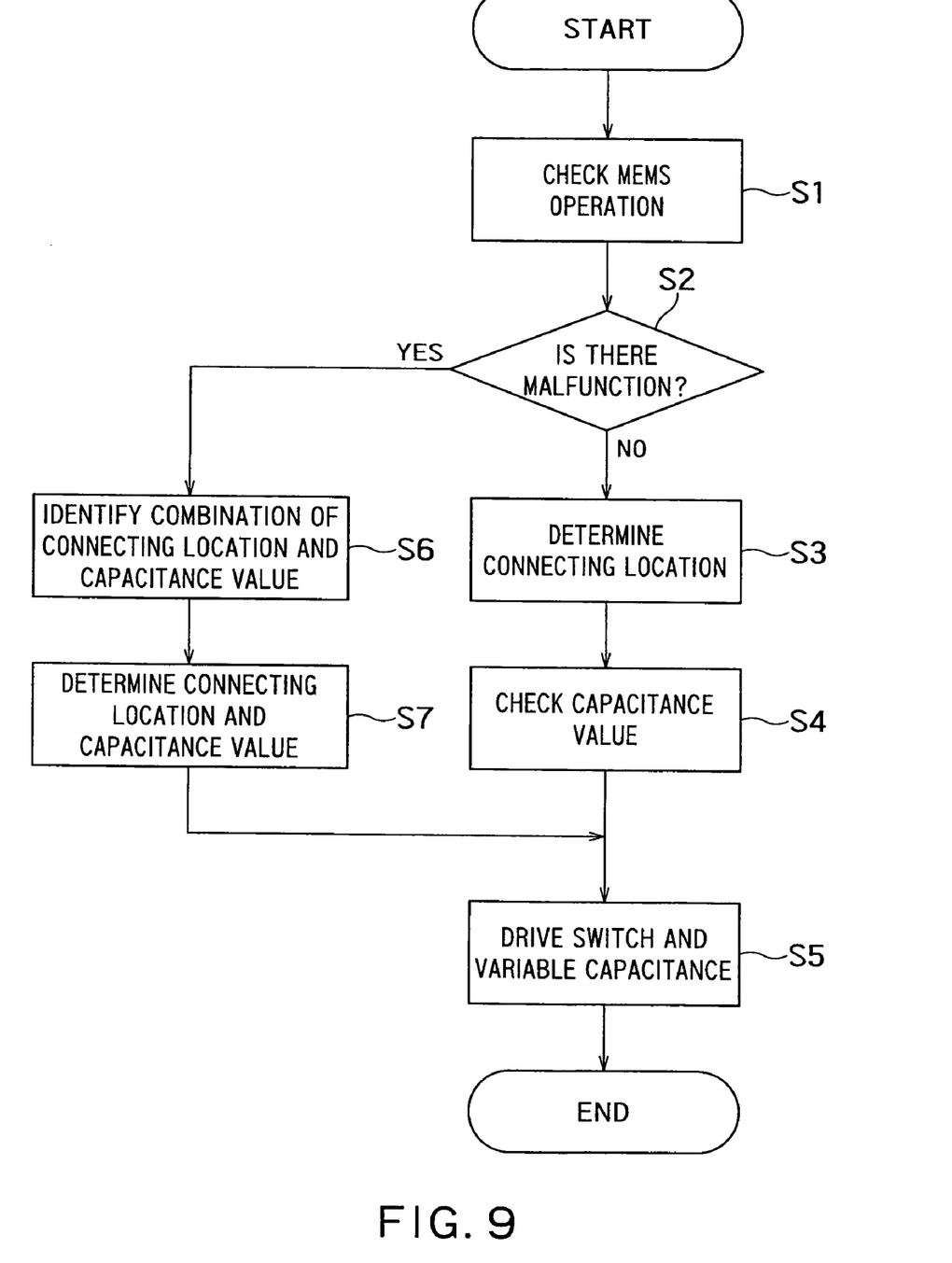
FIG. 9 is a flow chart for explaining the operation of the antenna device in FIG. 7.

FIG. 9 is a flow chart for explaining the operations of a MEMS controlling unit 108, a switch controlling unit 105, and a MEMS operation determining unit 109 in the antenna device in FIG. 7.

First, the MEMS operation determining unit 109 checks whether there is a malfunction (failure) in each of the MEMS capacitors 107A to 107C (S1).

If there is no malfunction (NO in S2), the switch controlling unit 105 selects a connecting location which is closest to the tip of the antenna element 102 on the basis of a desired operating frequency (S3), and the MEMS controlling unit 108 selects one corresponding to the connecting location (a total capacitance) from combinations of the ON/OFF states of the MEMS capacitors (S4).

The switch controlling unit 105 turns on one of the switches corresponding to the selected connecting location and turns off the remaining switches (S5). The MEMS controlling unit 108 switches the ON/OFF states of the MEMS capacitors 107A to 107C on the basis of the selected combination (S5).

On the other hand, if there is a malfunction in any of the MEMS capacitors 107A to 107C (YES in S2), the MEMS operation determining unit 109 detects whether the failed MEMS capacitor is fixed at ON state or OFF state. The MEMS operation determining unit 109 notifies the switch controlling unit 105 and MEMS controlling unit 108 of information identifying the failed MEMS capacitor and the state of the failed MEMS capacitor (ON or OFF).

The switch controlling unit 105 and MEMS controlling unit 108 identify combinations of the ON/OFF states of the MEMS capacitors other than the failed MEMS capacitor and switches by which the desired operating frequency can be achieved, on the premise of the state of the failed MEMS capacitor (S6). The switch controlling unit 105 and MEMS controlling unit 108 select one of the combinations which allows a switch closest to the tip of the antenna element to be turned on (S7).

The switch controlling unit 105 and MEMS controlling unit 108 control the ON/OFF states of the switches 104A to 104C and MEMS capacitors (excluding the failed one) in accordance with the selected combination.

In the above-described manner, it is possible to compensate for a malfunction in a MEMS capacitor while maintaining as high antenna efficiency as possible for a desired operating frequency.

Figure 10:
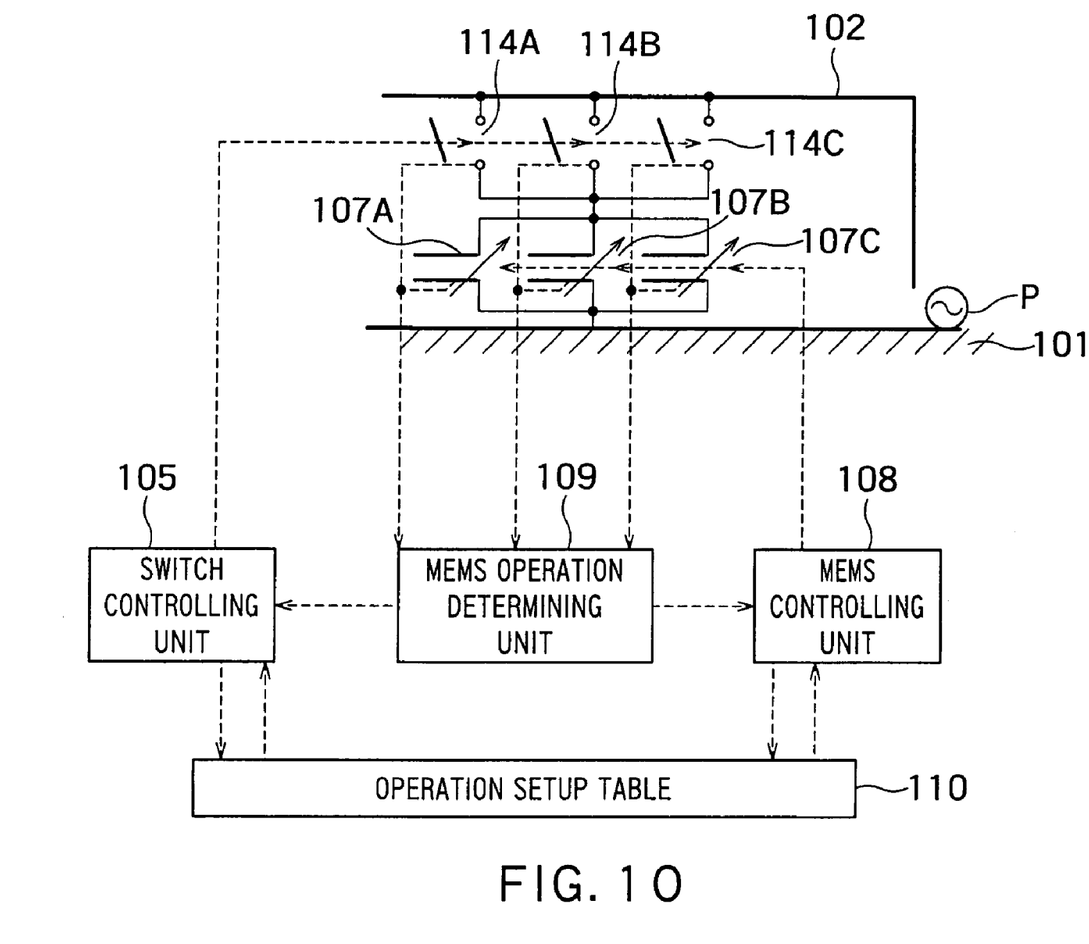
FIG. 10 is a diagram showing the schematic configuration of an antenna device according to a third embodiment of the present invention.

FIG. 10 is a diagram showing the schematic configuration of an antenna device according to a third embodiment of the present invention.

The antenna device is characterized in that the switches 104A to 104C in the antenna device according to the second embodiment (see FIG. 7) are replaced with switch elements 114A to 114C.

A MEMS operation determining unit 109 checks the operating states of the switch elements 114A to 114C and determines whether there is a failure. If there is a failure, the MEMS operation determining unit 109 detects whether each of the switch elements 114A to 114C is fixed at ON state or OFF state. The MEMS operation determining unit 109 includes a switch failure detecting unit which detects a failure in a switch and a switch state detecting unit which detects the ON/OFF state of a failed switch. The MEMS operation determining unit 109 notifies a switch controlling unit 105 and a MEMS controlling unit 108 of the result of the switch operation determination.

The switch controlling unit 105 and MEMS controlling unit 108 make a selection based on an operation setup table 110 in consideration of the states of the MEMS switches, in addition to the operations described in the second embodiment. Assume that the contents of the operation setup table 110 are the same as those shown in FIG. 8. For example, if one of the MEMS switches fails while being in OFF state, the switch controlling unit 105 and MEMS controlling unit 108 select one from combinations which do not turn on the failed MEMS switch. On the other hand, if one of the MEMS switches fails while being in ON state, the switch controlling unit 105 and MEMS controlling unit 108 select one having a desired operating frequency from combinations which turn on the failed MEMS switch. If there is no combination having the desired operating frequency, the switch controlling unit 105 and MEMS controlling unit 108 select one having the desired operating frequency from combinations which turn on one(s) of the switches that is (are) closer to an antenna feeding point than the failed MEMS switch. This is because if a plurality of switches are turned on, an operating frequency obtained when one of the switches closest to a feeding point is turned on is obtained, as has been described with reference to FIGS. 6(A) to 6(C). In other words, even if one of the switches which is closer to the tip of the antenna than the failed MEMS switch is turned on, obtained characteristics are little different from those before the turn-on.

Figure 11:
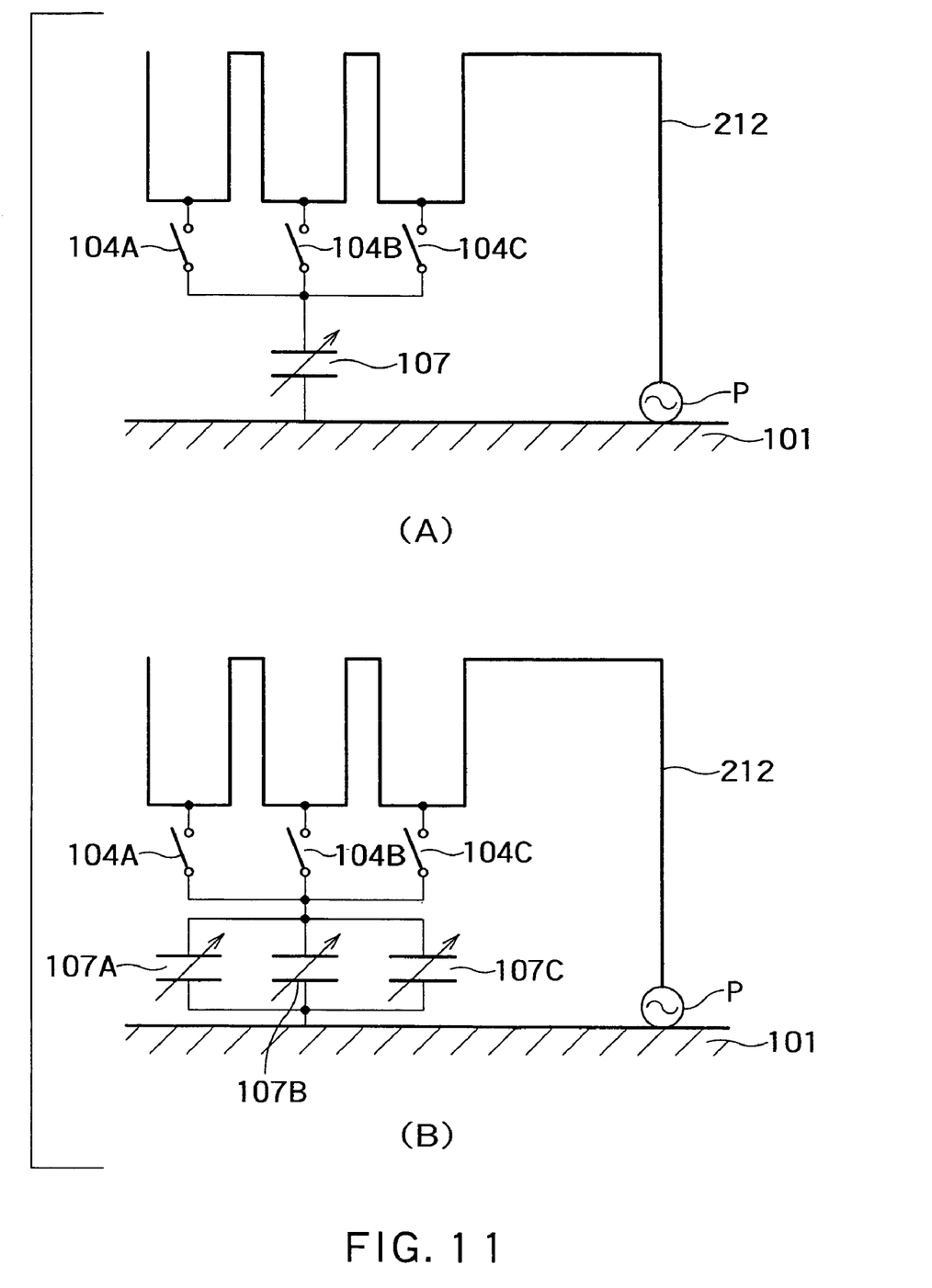
FIG. 11 is a diagram showing respective variations of the antenna devices in FIGS. 1 and 7.

FIG. 11(A) shows a variation of the antenna device in FIG. 1, and FIG. 11(B) shows a variation of the device in FIG. 7. While the antenna elements in FIGS. 1 and 7 have an L-shape, antenna elements 212 in FIGS. 11(A) and 11(B) have a meander shape. The antenna element of the antenna device in FIG. 10 may be configured to have a meander shape. Configuring an antenna element to have a meander shape makes it possible to set the interval between connecting locations on the antenna element to be longer without changing intervals at which switches are arranged. This allows easy implementation of a configuration capable of widely varying a frequency.

Figure 12:
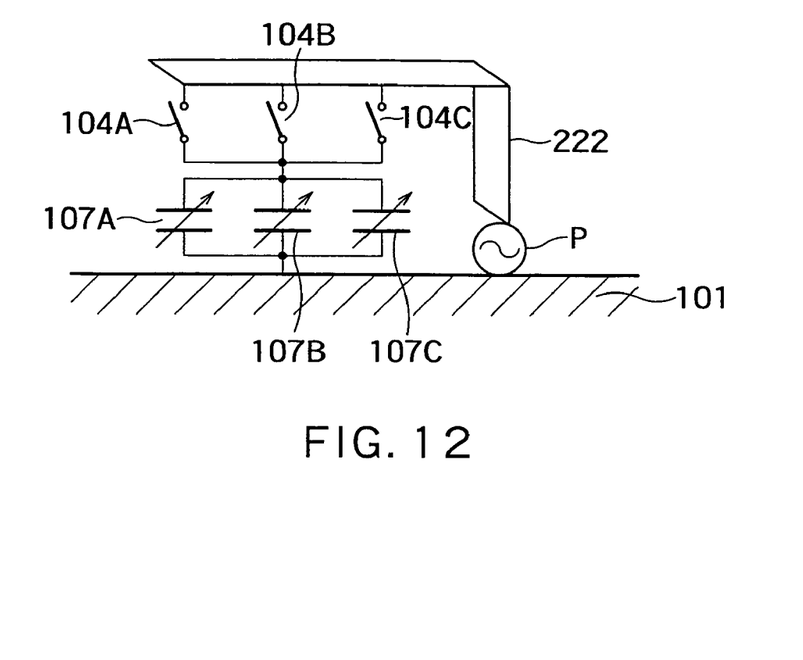
FIG. 12 is a diagram showing a variation of the antenna device in FIG. 7.

FIG. 12 shows a variation of the antenna device in FIG. 7. The variation is characterized in that an antenna element 222 has a plate-like shape. Configuring an antenna element to have a plate-like shape allows an increase in bandwidth. The antenna element in FIG. 10 may be configured to have a plate-like shape.

Figure 13:
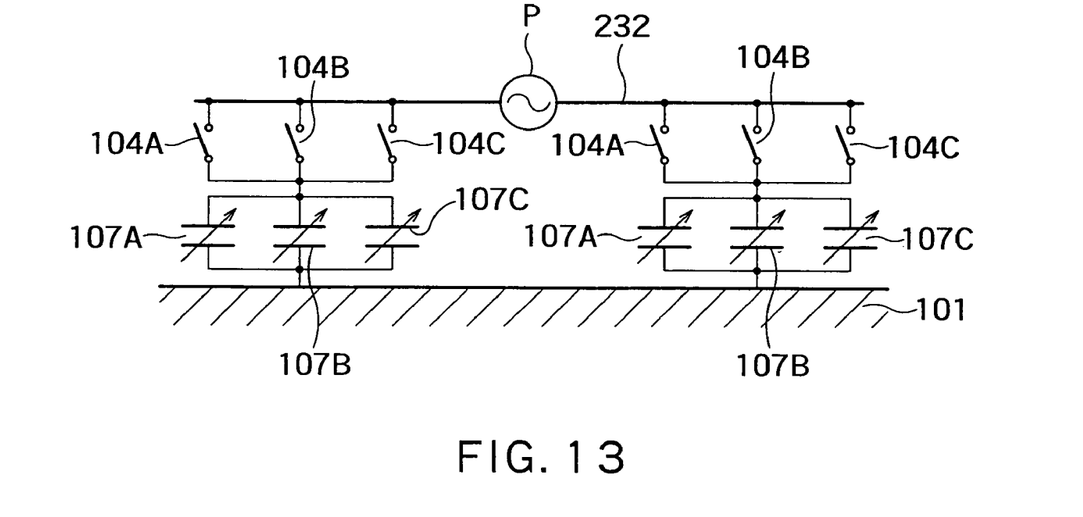
FIG. 13 is a diagram showing a variation of the antenna device in FIG. 7.

FIG. 13 shows a variation of the antenna device in FIG. 7. While the antenna element shown in FIG. 7 is of the monopole type, an antenna device may have an antenna element of the dipole type, like an antenna element 232 in this variation. The switches 104A to 104C and MEMS capacitors 107A to 107C are provided for each of radiating elements on the two sides of the feeding point P. An antenna element configured to be of the dipole type has the advantages of high noise resistance, ease in obtaining desired directivity, and the like. The antenna element in FIG. 10 may be configured to be of the dipole type.

Figure 14:
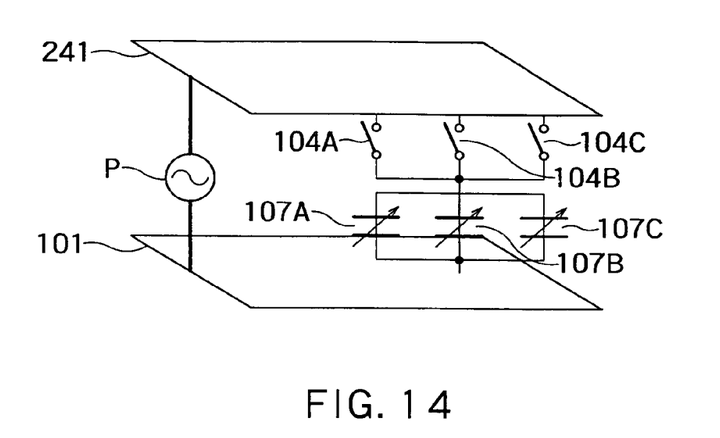
FIG. 14 is a diagram showing a variation of the antenna device shown in FIG. 7.

FIG. 14 shows a variation of the antenna device shown in FIG. 7. An antenna element in FIG. 14 is of the folded dipole type. The antenna element in FIG. 10 may be configured to be of the folded dipole type. The conductive ground plane 101 and a conductive plate 241 function as radiating elements. The conductive ground plane 101 and conductive plate 241 face each other, and the switches 104A to 104C and MEMS capacitors 107A to 107C intervene between the conductive ground plane 101 and the conductive plate 241. This configuration leads to the advantages of high noise resistance, ease in obtaining desired directivity, smaller size, and the like. Assume a case where the antenna device in FIG. 14 is applied to, e.g., a flip mobile phone. In this case, configuring the mobile phone such that the conductive ground plane 101 and conductive plate 241 face each other, as shown in FIG. 14, when the mobile phone is closed makes it possible to perform communication with the above-described advantages in closed state. The mobile phone may be configured to perform normal communication through the plate-like dipole antenna using the conductive ground plane 101 and conductive plate 241 as the radiating elements when it is opened such that the conductive ground plane 101 and conductive plate 241 are substantially flush with each other.

Figure 15:
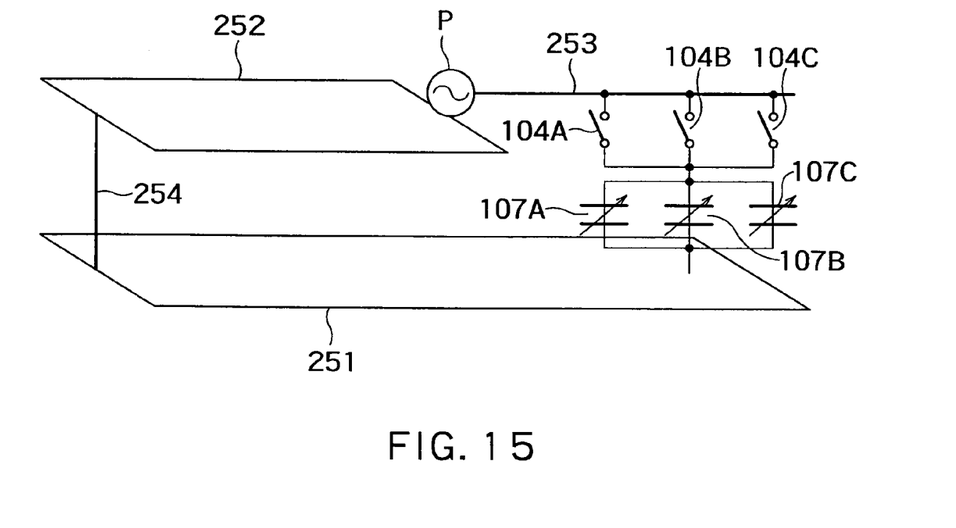
FIG. 15 is a diagram showing a variation of the antenna device in FIG. 14.

FIG. 15 shows a variation of the antenna device in FIG. 14. While the feeding point P is located at the center of the antenna element in the antenna device in FIG. 14, a feeding point is offset from the center in an antenna device in FIG. 15. This configuration leads to the advantages of an increase in design flexibility, ease in increasing bandwidth by multiple resonance, and the like. Reference numeral 251 denotes a conductive ground plane; 252, a conductive plate; 253, a linear element; and 254, a connecting element. These components 251 to 254 form the antenna element (substantially ½ wavelength).

Figure 16:
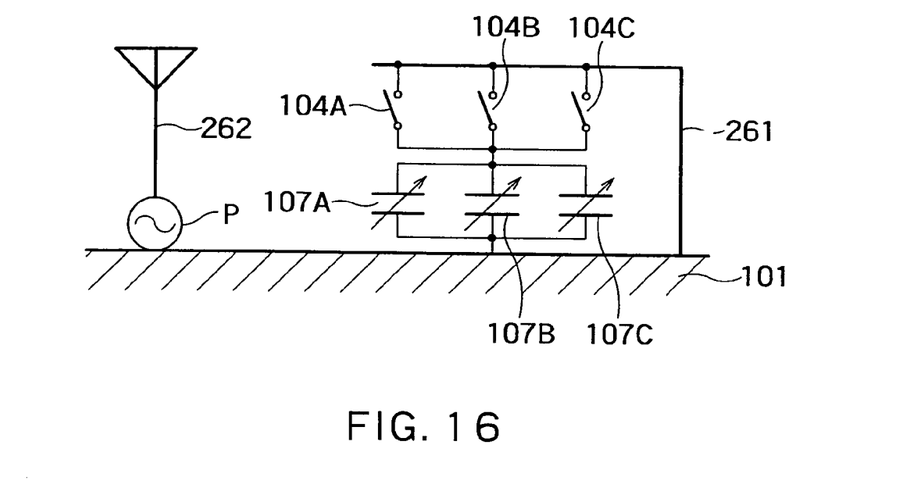
FIG. 16 is a diagram showing a variation of the antenna device shown in FIG. 7.

FIG. 16 shows a variation of the antenna device shown in FIG. 7. The variation is obtained by replacing the antenna element in FIG. 7 with a passive element 261, and the passive element 261 is spaced apart from a feeding element 262 by a predetermined distance. This use of a passive element as an antenna element leads to the advantages of an increase in the flexibility in the design of the feeding element 262, ease in increasing bandwidth by multiple resonance, and the like. A passive element may be used as the antenna element of the antenna device shown in FIG. 10.

Figure 17:
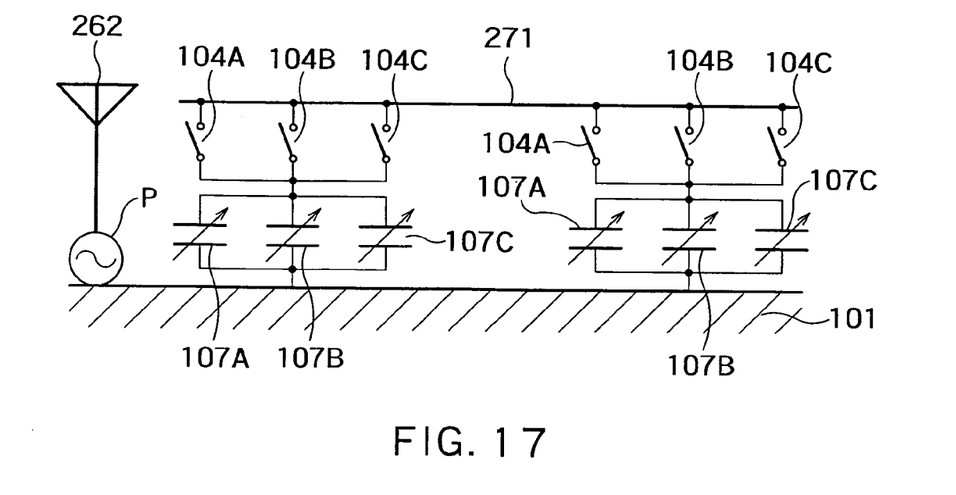
FIG. 17 is a diagram showing a variation of the antenna device shown in FIG. 13.

FIG. 17 shows a variation of the antenna device shown in FIG. 13. The variation is obtained by replacing the antenna element (dipole antenna element) in FIG. 13 with a passive element 271, and the passive element 271 is spaced apart from the feeding element 262 by a predetermined distance. This configuration makes it possible to have the advantages of an increase in the flexibility in the design of the feeding element 262, ease in increasing bandwidth by multiple resonance, ease in obtaining desired directivity, and the like.

Figure 18:
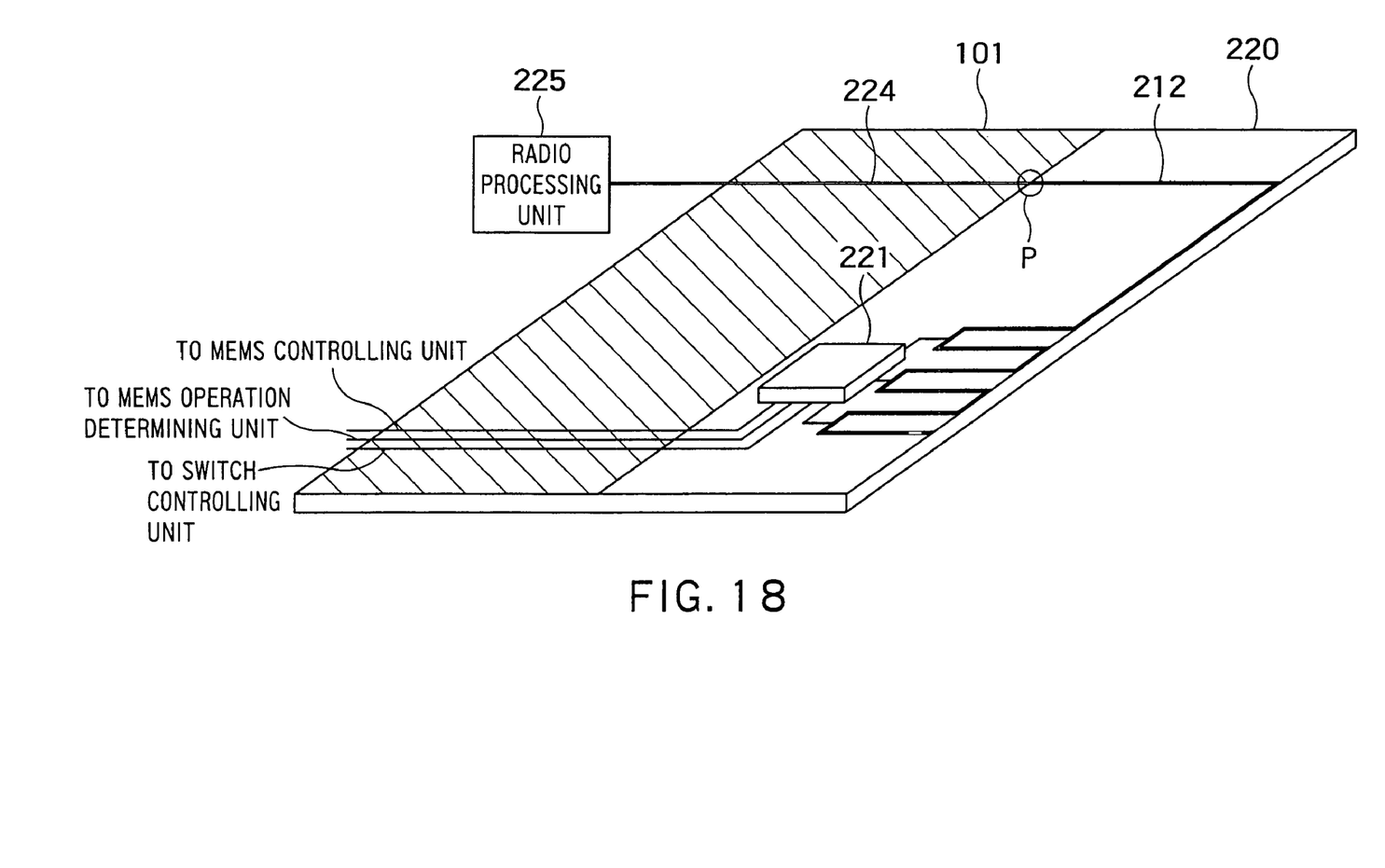
FIG. 18 is a view showing the schematic configuration of a radio communication terminal having the antenna device in FIG. 11(B) mounted therein.

FIG. 18 shows the schematic configuration of a radio communication terminal having the antenna device in FIG. 11(B) mounted therein.

The meander-shaped antenna element 212 is set on a PCB (Printed Circuit Board) board 220 of the radio communication terminal, and the conductive ground plane 101 is formed in a region different from a region where the antenna element 212 is set. A radio processing unit 225 generates a radio frequency signal by subjecting data to be transmitted to radio processing, including modulation, frequency conversion, and amplification, and supplies the generated radio frequency signal to the feeding point P of the antenna element 212 through a feeding line 224. A module 221 includes the switches 104A to 104C and MEMS capacitors 107A to 107C.

The module 221 is connected to the meander-shaped antenna element 212 at three points through the switches 104A to 104C and is also connected to the conductive ground plane 101 through the MEMS capacitors 107A to 107C. The MEMS controlling unit, MEMS operation determining unit, and switch controlling unit are connected to the module 221 through connecting wires.

Figure 19:
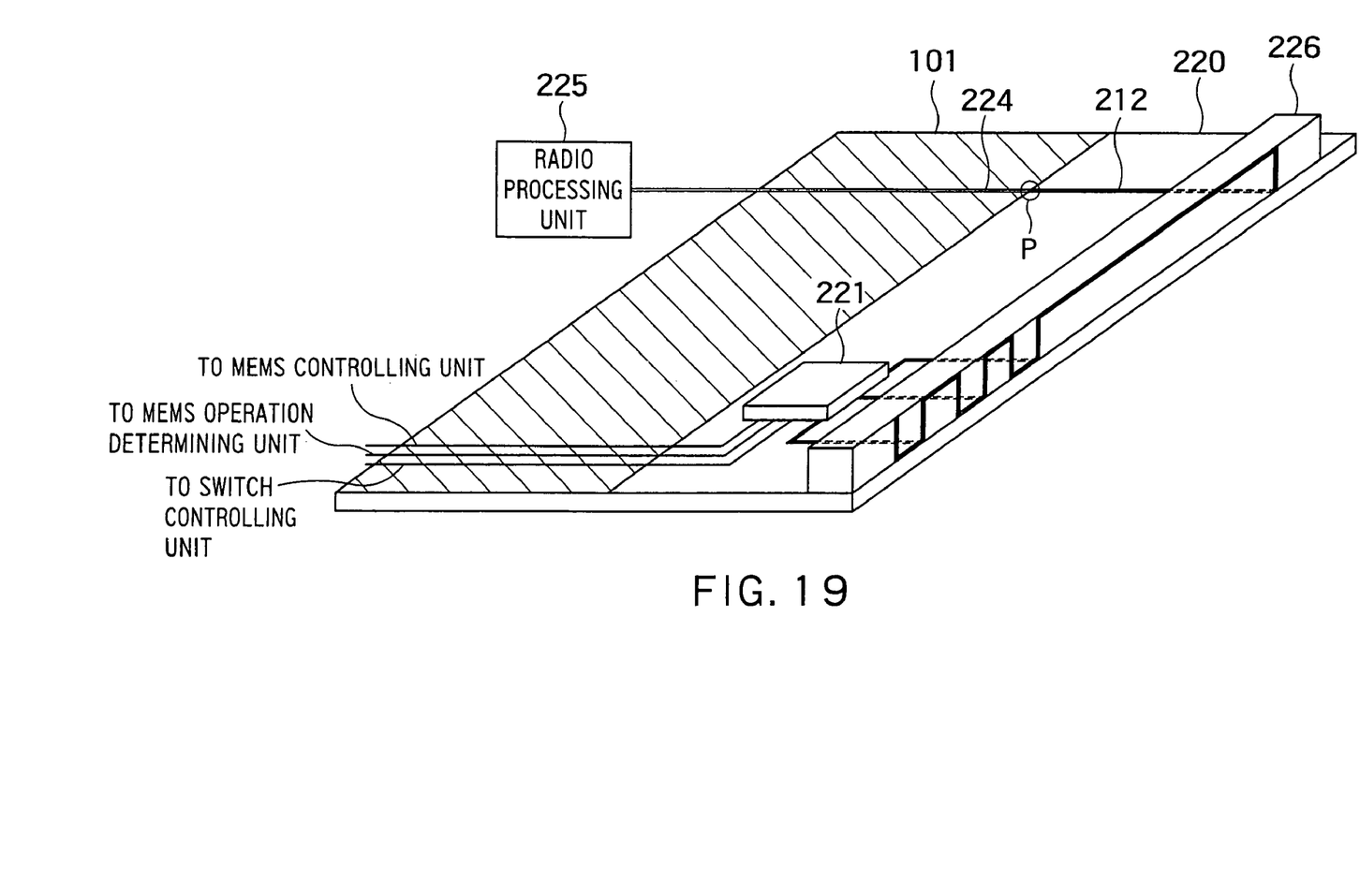
FIG. 19 is a view schematically showing a variation of the radio communication terminal in FIG. 18.

FIG. 19 schematically shows a variation of the radio communication terminal in FIG. 18.

A dielectric block 226 with a dielectric constant higher than that of the PCB board 220 is provided along an edge of the PCB board 220, and a main part of the antenna element 212 is formed at a longitudinal side (on the outer side of the board) of the dielectric block 226. The part of the antenna element 212 other than the main part is formed on the PCB board 220. The part extends from the feeding point P, is pressed down by the dielectric block 226 against the PCB board 220 midway therethrough, is led out to the side of the dielectric block 226, and is connected to the main part. Wires connecting the module 221 and antenna element 212 are formed on the PCB board 220. The wires extend from the module 221, are pressed down by the dielectric block 226 against the PCB board 220, are led out to the side of the dielectric block 226, and are connected to the antenna element 212. The formation of the antenna element at the dielectric block 226 with the high dielectric constant makes it possible to make the antenna element shorter due to the wavelength shortening effect and thus allows a decrease in the size of an antenna device.

An antenna device according to the present invention, embodiments of which have been described above, can also be operated as an antenna for receiving digital terrestrial broadcasting by being mounted in a portable terminal, a notebook PC, or an FPD (Flat Panel Display).

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

What is claimed is:

1. An antenna device comprising:
a conductive ground plane;
an antenna including a radiating element;
at least one variable capacitor having a first end connected to the conductive ground plane;
a plurality of switch elements having respective first ends connected to a second end of said at least one variable capacitor and respective second ends connected to the antenna at different locations;
a switch controlling unit configured to control an ON/OFF state of each of the switch elements; and
a capacitor controlling unit configured to control a capacitance of said at least one variable capacitor;
an operation setup table configured to hold operating frequencies of the antenna, each corresponding to a combination between a capacitance level of said at least one variable capacitor and ON/OFF states of the switch elements; and
a detecting unit configured to detect one combination corresponding to a desired operating frequency from among the combinations in the operation setup table, wherein
the capacitor controlling unit controls said at least one variable capacitor in accordance with the detected combination, and
the switch controlling unit controls the switch elements in accordance with the detected combination.

2. The device according to claim 1, further comprising:
an operating frequency receiving unit configured to receive information of the desired operating frequency from an external device, wherein
the detecting unit specifies the desired operating frequency based on received information.

3. The device according to claim 1, further comprising:
a feeding point configured to supply power to a first end of the antenna.

4. The device according to claim 1, wherein
the radiating element is a passive element, and one end of the radiating element is connected to the conductive ground plane.

5. The device according to claim 3, wherein
when there are a plurality of combinations corresponding to the desired operating frequency in the operation setup table, the detecting unit selects one combination which allows the switch element closest to a second end of the antenna to be turned on, from the plurality of combinations.

6. The device according to claim 1, further comprising:
a capacitor failure detecting unit configured to detect a failure in a variable capacitor; and
a capacitance level detecting unit configured to detect a capacitance level of a failed variable capacitor, wherein
the detecting unit selects one combination in which a capacitance level of the failed variable capacitor accords with a detected capacitance level from among the combinations in the operation setup table.

7. The device according to claim 1, further comprising:
a switch failure detecting unit configured to detect a failure in a switch element; and
a switch state detecting unit configured to detect whether a failed switch element is in an ON state or OFF state, wherein
the detecting unit selects one combination in which a state of the failed switch element accords with a detected state from among the combinations in the operation setup table.

8. The device according to claim 1, wherein
said at least one variable capacitor is a MEMS capacitor.

9. The device according to claim 1, wherein
the switch elements are MEMS switches, respectively.

10. A radio communication device comprising:
an antenna device according to claim 1; and
a radio processing unit configured to perform radio communication through the antenna device.

* * * * *